Patented June 23, 1925.

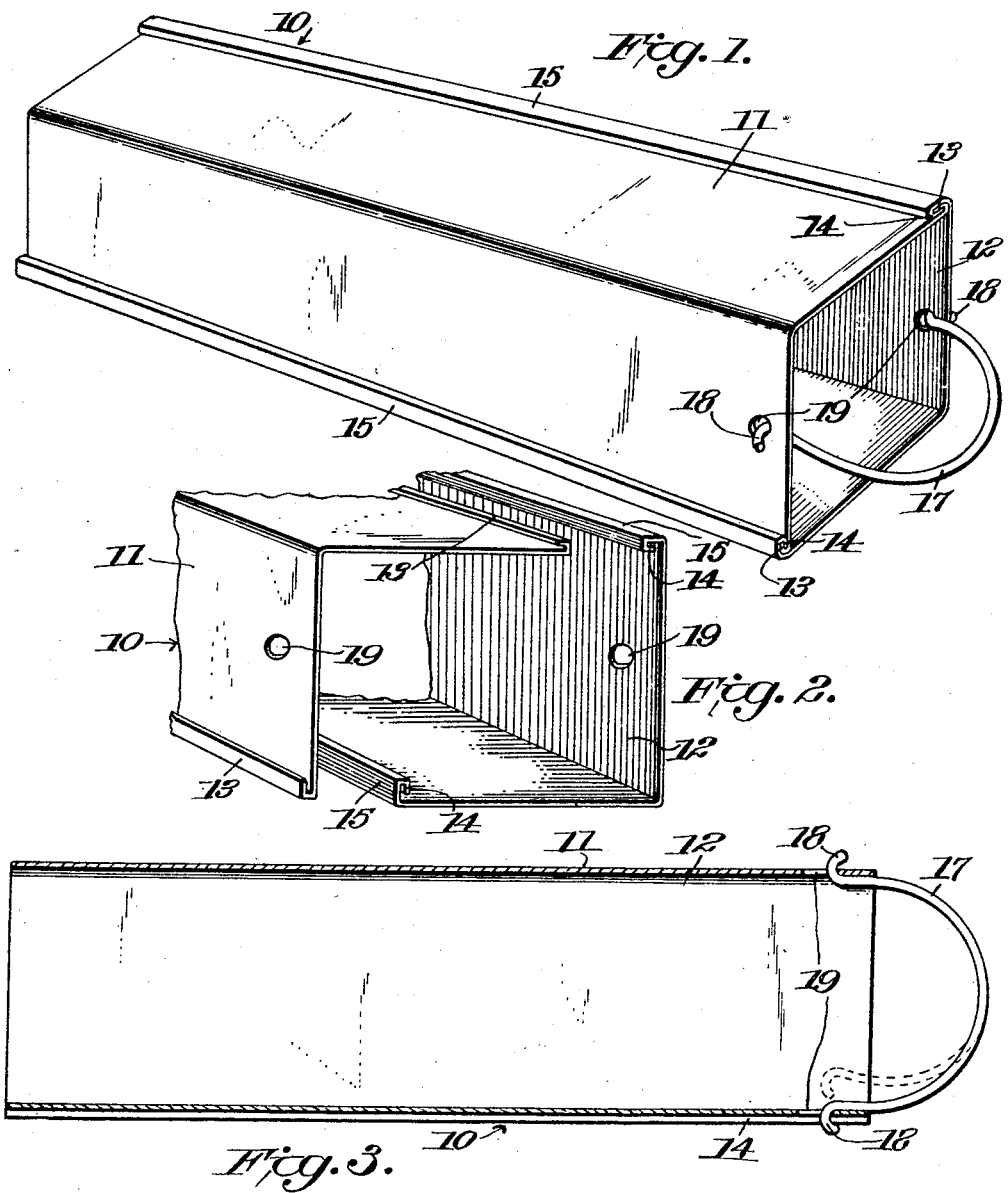

1,543,389

UNITED STATES PATENT OFFICE.

CHARLES HENRY KNIGHT, OF LOUISVILLE, KENTUCKY.

MOLD.

Application filed April 9, 1924. Serial No. 705,333.

*To all whom it may concern:*

Be it known that I, CHARLES H. KNIGHT, a citizen of the United States, residing at Louisville, in the county of Jefferson and State of Kentucky, have invented certain new and useful Improvements in Molds, of which the following is a specification.

This invention relates to a mold especially designed to produce meat products preferably in the popular square or rectangular loaf or sausage form.

A prime object is to provide a construction which is durable and practical when made from solid or imperforate material.

A second object is to produce such a mold wherein the sections are separably and slidably connected together by novel seams or hook flanges, and in which a handle bail coacts with the sections to support each section against movement relatively to the adjacent section.

An operative embodiment is disclosed in accompanying drawings wherein:

Figure 1 is a perspective view of the mold;

Figure 2 is a fragmentary perspective view of the mold sections in separated relation, and Figure 3 is a longitudinal sectional view through the mold taken on the plane of the handle bail.

Referring to the drawing in detail, the mold comprises a rectangular or square basket body 10 open at each end. Body 10 consists of relatively slidable separable sections 11 and 12 each of which is generally of L-shape and stamped from solid or imperforate sheet metal or other approved material.

At the longitudinal edges of the section 11 and throughout the length of the latter are outwardly directed hook flanges 13. Said hook flanges 13 detachably slide or telescope in inwardly directed hook flanges 14 of the same length as and located at the longitudinal edges of section 12. The hook flanges 14 form parts of offset webs 15 and their distal edges longitudinally face the main walls of section 12. The hook flanges are located without the interior space of the mold so that such space will be free of obstructions in order to have the desired square or rectangular shape.

A bail or handle 17 has hook ends 18 which are normally disposed in openings 19 provided one through each section 11 and 12 so that both sections will be connected thereto. Bail 17 may be of suitable gauge resilient metallic wire to enable it to be compressed to detach either or both hook ends 18 from the openings 19, as suggested by the dotted lines in Figure 3. Said hook ends 18 may be of any desired shape or size.

Considering the mold as assembled like in Figures 1 and 3, a casing for the meat sausage, loaf or product either empty or partially filled as deemed expedient by the worker, is placed within the mold or body 10 and thereafter filled and packed until the casing and contents conform to the shape of the mold whereupon the casing is closed in the usual way. Said sausage while contained in body 10 is usually smoked and cooked. The product after these steps may be withdrawn from the mold by pulling the same and the mold relatively to each other or by detaching one or both of the hook ends 18 from the openings 19 and then sliding the sections 11 and 12 apart to release the product. The mold is readily reassembled by sliding the sections 11 and 12 together and applying the bail 17 by clipping the hook ends 18 into the openings 19 as shown in Figures 1 and 3.

I claim:

1. In a mold of the class described, a body composed of relatively slidable sections, and a bail of stiff material to support said sections detachably connected to one of the sections and normally preventing relative movement of the sections.

2. In a mold of the class described, a body composed of relatively slidable sections separable from each other, a resilient bail to support said sections, and said bail having a hook end detachably engaging an opening in one of the sections.

3. In a mold of the class described, a body composed of substantially L-shaped sections of imperforate material, said sections at their meeting edges having interengaging hook flanges, and a bail common and connected to each section.

4. In a mold of the class described, a body composed of substantially L-shaped sections of imperforate material, said sections being relatively slidable for detachment, one of the sections having outwardly extending hook flanges at its longitudinal edges, the other section having webs angularly disposed with relation to its respective walls, said webs having inwardly extending hook flanges telescopically engageable by the first mentioned hook flanges and at their distal longitudinal edges facing said respective walls, each section having an opening, and a resilient bail having hook ends adapted to clip into said openings.

CHARLES HENRY KNIGHT.